(12) United States Patent
Tan et al.

(10) Patent No.: US 8,509,091 B2
(45) Date of Patent: Aug. 13, 2013

(54) METHOD, SYSTEM AND ENTITY OF REALIZING EVENT DETECTION

(75) Inventors: Shiyong Tan, Shenzhen (CN); Yan Li, Shenzhen (CN); Weihua Wei, Shenzhen (CN); Shibi Huang, Shenzhen (CN); Peng Zhao, Shenzhen (CN); Yuxin Mao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 497 days.

(21) Appl. No.: 12/582,511

(22) Filed: Oct. 20, 2009

(65) Prior Publication Data
US 2010/0039941 A1  Feb. 18, 2010

Related U.S. Application Data

(63) Continuation of application No. PCT/CN2008/070745, filed on Apr. 17, 2008.

(30) Foreign Application Priority Data

Apr. 20, 2007  (CN) .......................... 2007 1 0103109

(51) Int. Cl.
*G01R 31/08* (2006.01)
(52) U.S. Cl.
USPC ........................................... 370/241; 30/252
(58) Field of Classification Search
USPC ....................................................... 370/241
See application file for complete search history.

(56) References Cited

U.S. PATENT DOCUMENTS

| 2007/0060101 | A1 | 3/2007 | Duan |
| 2007/0066286 | A1 | 3/2007 | Hurtta |
| 2008/0256251 | A1* | 10/2008 | Huotari et al. ................. 709/229 |

FOREIGN PATENT DOCUMENTS

| CN | 1423456 A | 6/2003 |
| CN | 1642115 A | 7/2005 |
| CN | 1645805 A | 7/2005 |
| CN | 1735023 A | 2/2006 |
| CN | 101291233 B | 4/2011 |
| WO | WO 2006/050758 A1 | 5/2006 |
| WO | 2007026268 A1 | 3/2007 |

OTHER PUBLICATIONS

Written Opinion of the International Search Authority issued in corresponding PCT Patent Application No. PCT/CN2008/070745, mailed Aug. 14, 2008.
Extended European Search Report issued in corresponding European Patent Application No. 08734103.8, mailed Oct. 14, 2010.

(Continued)

*Primary Examiner* — David Oveissi
(74) *Attorney, Agent, or Firm* — Brinks Hofer Gilson & Lione

(57) ABSTRACT

A method and a system of realizing event detection are provided, which detect a status of an Internet Protocol (IP) connectivity access network (IP-CAN) bearer corresponding to a policy and charging control (PCC) rule by binding an Event-Trigger parameter to the PCC rule, thereby realizing small-granularity detection for the specific PCC rule and reducing the load of the system. Furthermore, a status of the IP-CAN bearer or an IP flow is realized by binding the Event-Trigger parameter to an IP-CAN identifier (ID) or an IP flow ID, so as to avoid the problem about too large granularity of the binding of event detection and IP-CAN session and reduce the burden of the IP-CAN bearer detection and message exchange.

6 Claims, 8 Drawing Sheets

(56) References Cited

OTHER PUBLICATIONS

"3$^{rd}$ Generation Partnership Project: Technical Specification Group Services and System Aspects; Policy and charging control architecture (Release 7)", Global System for Mobile Communications. 3GPP TS 23.203, V7.2.0, Mar. 2007.

Nokia Siemens Networks, "Removing of Event Triggers", Change Request. 3GPP TSG-CT WG3 Meeting #43bis, Frankfurt, Germany, Apr. 11-12, 2007.

Canadian Office Action issued in corresponding Canadian Patent Application No. 2,682,979, mailed Aug. 26, 2011.

3rd Generation Partnership Project; Technical Specification Group Core Network and Terminals; Policy and Charging Control over Gx reference point (Release 7) 3GPP TS 29.212 V7.0.0 Mar. 31, 2007.

* cited by examiner

METHOD, SYSTEM AND ENTITY OF REALIZING EVENT DETECTION

CROSS-REFERENCE TO RELATED APPLICATIONS

This application is a continuation of International Application No. PCT/CN/2008/070745, filed on Apr. 17, 2008, which claims priority to Chinese Patent Application No. 200710103109.8, filed on Apr. 20, 2007, both of which are hereby incorporated by reference in their entireties.

FIELD OF THE INVENTION

The present invention relates to the policy and charging control (PCC) technology, and more particularly to a method, a system, and an entity of realizing event detection during the PCC.

BACKGROUND OF THE INVENTION

In the development of a communication network, the communication network undergoes an evolution from a conventional circuit switched network to an Internet Protocol (IP) packet switched network with separated control and bearer mechanisms, and then to a full IP multimedia network.

Currently, the next generation network has completely started to use IP as a bearer. In the evolution towards a full IP network, the problem of end-to-end quality of service (QoS) needs to be considered, so as to provide services, especially real-time services satisfactory to customers. Since the IP network can provide more kinds of services such as multimedia call, file downloading, and webpage browsing, the network is required to be capable of detecting different service flows, making statistics of charging information such as traffic and duration, and reporting the charging information to a charging center. In order to solve relevant problems about QoS and flow-based charging, the 3rd Generation Partnership Project (3GPP) defines a PCC architecture, which enables the network to detect different service flows and realizes QoS control and makes charging statistics for various service flows.

FIG. 1 is a schematic view of a PCC architecture. As shown in FIG. 1, the PCC architecture mainly includes a policy control and charging rules function (PCRF), a policy and charging enforcement function (PCEF), a subscription profile repository (SPR), an application function (AF), an offline charging system (OFCS), and an online charging system (OCS).

The PCRF decides corresponding PCC rules according to a limitation of a user's access to a network, an operator's policy, user subscription data, information of a service currently used by the user (acquired from the AF), and so on, and provides the policy to the PCEF, so that the PCEF executes the PCC rules. The PCC rules include detection rules for a service data flow, that is, a collection of IP flows for accomplishing a certain service such as voice, whether to perform gating, QoS corresponding to the service data flow, flow-based charging rules, and so on.

The PCEF, located in a gateway (GW), is configured to execute PCC rules delivered or designated by the PCRF. Specifically, the PCEF performs the detection and measurement of a service data flow, ensures the QoS of the service data flow, user plane traffic processing, control plane session management triggering, and so on. The PCRF dynamically generates or modifies corresponding PCC rules according to session information from an application layer of the AF.

The PCRF and the PCEF are connected via a GX reference point. The GX reference point mainly realizes the following functions: establishing, maintaining, and terminating an IP connectivity access network (IP-CAN) session, enabling the PCEF to request PCC rules from the PCRF; enabling the PCRF to provide PCC rules to the PCEF; and negotiating a mode of establishing an IP-CAN bearer. The GX reference point uses a Diameter protocol defined by the Internet Engineering Task Force (IETF).

To make the process of the present invention more comprehensible, several terms are explained first.

The IP-CAN refers to an access network having a property of reserving IP service continuity, that is, keeping the service uninterrupted, when a user roams in an access network, that is, when the user changes his/her position in the access network, for example, a general packet radio service (GPRS) network, an interworking wireless local area network (I-WLAN) network, and so on.

The IP-CAN bearer refers to an IP transmission path having explicit rate, delay, and bit error ratio (BER), which is a path from an access network to a GW. For example, the IP-CAN bearer is corresponding to a packet data protocol (PDP) context in a GPRS network.

IP-CAN session refers to a connection relationship between a user equipment (UE) and a packet data network (PDN), for example, an internet network identifier (ID), which is identified by an IP address of the UE and an ID of the UE. As long as the UE is assigned with an IP address and can be identified by an IP network, an IP-CAN session exists. The IP-CAN session may include one or more IP-CAN bearers.

As known from a process of establishing an IP-CAN session and a process of establishing an IP-CAN bearer in the prior art, a binding relationship shown in FIG. 2 is formed on the PCEF/GW. FIG. 2 is a schematic view of a binding relationship among an IP-CAN session, IP-CAN bearers, PCC rules, and IP flows. As shown in FIG. 2, it is assumed that, in the establishment of the IP-CAN session, two IP-CAN bearers with different QoS requirements are established in the same IP-CAN session, so as to satisfy different QoS requirements, and each IP-CAN bearer may have a plurality of IP flows, for example, the user may download files from different servers at the same time. As shown in FIG. 2, an IP-CAN bearer 1 includes two IP flows, that is, IP flow 1 and IP flow 2, and an IP-CAN bearer 2 includes four IP flows, that is, IP flow 3 to IP flow 6.

When determining PCC rules in the prior art, the PCRF is required to send a credit control answer (CCA) message to the PCEF/GW and carry PCC rules in the CCA message. The specific message format is shown as follows (for the sake of simplicity, not all parameters are listed):

```
<CC-Answer> ::=   < Diameter Header: 272, PXY >
          < Session-Id > (Session ID, corresponding to
one IP-CAN session)
             { Auth-Application-Id }
             { Origin-Host }
             { Origin-Realm }
           *[ Event-Trigger ] (Event to be detected)
          *[ Charging-Rule-Install ] (PCC rules to be executed,
and an IP-CAN bearer ID is further included if the PCRF performs
bearer binding)
```

As seen from the existing CCA message format, the event detection delivered by the PCRF to the PCEF/GW is directed to the entire IP-CAN session. The method in the prior art only performs event detection directed to the whole IP-CAN session, and thus causes the following defects.

In the actual application, the PCRF may need to detect a status of a corresponding IP flow in a certain IP-CAN bearer or a certain PCC rule, instead of a status of the whole IP-CAN session. However, in the prior art, the PCEF/GW may detect IP-CAN bearers or IP flows which the PCRF is not interested in and then report the detection status thereof, but the PCRF does not need such information. In this way, redundant message exchange definitely occurs between the PCRF and the PCEF/GW, so that unnecessary load is increased between the two equipments. For example, the PCRF is not interested in the situation of short-time interruption of file downloading via the IP-CAN Bearer 2 shown in FIG. 2, but in the existing method, the PCEF/GW also reports the interruption information if the IP-CAN Bearer 2 is interrupted.

SUMMARY OF THE INVENTION

One of various embodiment of the present invention provides a method of realizing event detection, which is capable of performing small-granularity detection for a designated PCC rule and reducing a load of a system.

One of various embodiment of the present invention provides a system of realizing event detection, which is capable of performing small-granularity detection for a designated PCC rule and reducing a load of a system.

One of various embodiment of the present invention further provides an entity of realizing event detection, which is capable of performing small-granularity detection for a designated PCC rule.

In order to achieve the above objectives, the technical solutions in embodiments of the present invention are specifically realized as follows.

A method of realizing event detection includes: carrying, by a PCPR, an Event-Trigger parameter bound to a designated PCC rule when sending PCC rules to a PCEF/GW; and detecting, by the PCEF/GW, the status of an IP-CAN bearer corresponding to the PCC rule associated with an event indicated by the Event-Trigger parameter after receiving the Event-Trigger parameter.

A system of realizing event detection at least includes a PCEF/GW and a PCRF. The PCRPF is configured to carry an Event-Trigger parameter bound to a designated PCC rule when sending PCC rules to the PCEF/GW. The PCEF/GW is configured to detect a status of an IP-CAN bearer corresponding to the PCC rule associated with an event indicated by the Event-Trigger parameter after receiving the Event-Trigger parameter.

A PCRF is provided. The PCRF is configured to send PCC rules to a PCEF and carry an Event-Trigger parameter bound to a designated PCC rule.

A PCEF is provided. The PCEF is configured to receive a PCC rule bound to an Event-Trigger parameter, and is further configured to detect a status of an IP-CAN bearer corresponding to the PCC rule associated with an event indicated by the Event-Trigger parameter.

As seen from the above technical solutions, in the present invention, the PCRF carries an Event-Trigger parameter bound to a designated PCC rule when sending PCC rules to the PCEF/GW, and the PCEF/GW detects a status of an IP-CAN bearer corresponding to the PCC rule of an event indicated by the Event-Trigger parameter after receiving the Event-Trigger parameter, so as to avoid detecting a status of an entire IP-CAN session in any situation, thereby performing small-granularity detection for the specific PCC rule, and reducing the load of the system.

DETAILED DESCRIPTION OF THE EMBODIMENTS

Figure 1:
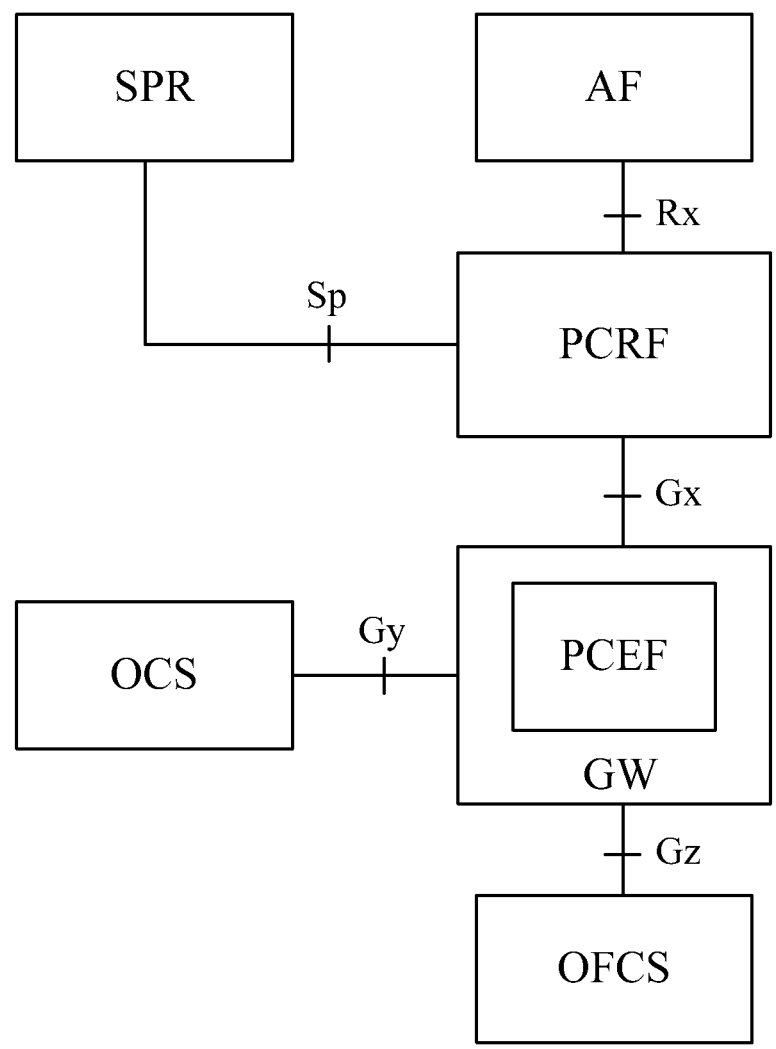
FIG. 1 is a schematic view of a PCC architecture.

An embodiment of the present invention is realized as follows. A PCRF carries an Event-Trigger parameter bound to a designated PCC rule when sending PCC rules to a PCEF/GW. The PCEF/GW detects a status of an IP-CAN bearer corresponding to the PCC rule associated with an event indicated by the Event-Trigger parameter after receiving the Event-Trigger parameter.

In general, during the establishment of an IP-CAN session, after receiving an IP-CAN session establishment request from a UE, the PCEF/GW notifies the PCRF and sends a credit control request (CCR) message carrying an ID and an IP address of the UE to the PCRF. The PCRF stores the information carried in the CCR message, further requests user subscription information from an SPR if the user subscription information is required, and then generates and stores a PCC rule. The PCRF delivers the PCC rule to the PCEF/GW through a CCA message. The PCEF/GW installs the rule and opens or closes a corresponding service data flow according to the rule, so as to ensure the corresponding QoS. If the PCEF/GW performs the binding of an IP-CAN bearer to the PCC rule, the GW selects an appropriate IP-CAN bearer according to the requirement of the PCC rule. Finally, the PCEF/GW returns an IP-CAN session establishment response message to the UE.

It should be noted that, if the PCRF performs the binding of the IP-CAN bearer to the rule, the CCR message further carries an IP-CAN bearer ID. Meanwhile, the PCRF further needs to record a binding relationship between the PCC rule and the IP-CAN bearer ID when generating the PCC rule. At the same time, the CCA message also indicates the binding relationship between the PCC rule and the IP-CAN bearer ID, that is, the bound PCC rule is executed on the IP-CAN bearer designated by the IP-CAN bearer ID. Moreover, the PCEF/GW executes the PCC rule on the corresponding IP-CAN bearer according to the binding relationship between the PCC rule and the IP-CAN bearer ID of the PCRF.

Upon receiving an IP-CAN session message initiated by the UE, the PCEF/GW requests to establish a new IP-CAN bearer, for example, establishing a second PDP context in the GPRS. During the establishment of the IP-CAN bearer, the PCEF/GW sends a CCR message to the PCRF to request a PCC rule for the IP-CAN bearer. If the PCRF performs the binding of the IP-CAN bearer to the rule, the GW further needs to report a new IP-CAN bearer ID. The PCRF stores information carried in the CCR message and associates the IP-CAN session with a specific AF session (one IP-CAN session may be associated with a plurality of AF sessions) by using the information received from the PCEF/GW and service information obtained from an AF. Afterwards, the PCRF generates and saves a new PCC rule according to the service information, user subscription information, operator configuration information, and other information.

The PCRF carries the new PCC rule in a CCA message and returns the CCA message to the PCEF/GW. If the PCRF performs the binding of the IP-CAN bearer to the rule, the CCA message is further required to indicate that the PCC rule is executed on the newly established IP-CAN bearer. The PCEF/GW installs the rule and opens or closes a corresponding service data flow according to the rule, so as to ensure the corresponding QoS. The PCEF/GW returns an IP-CAN session response message to the UE.

Figure 2:
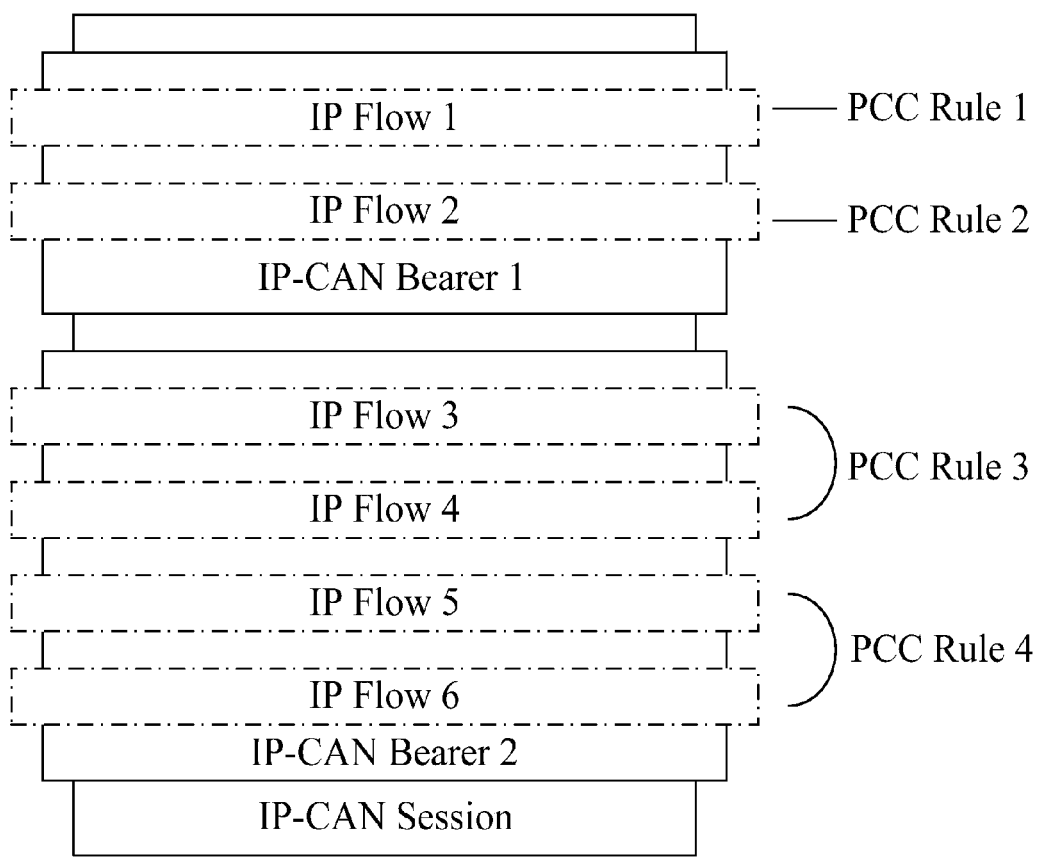
FIG. 2 is a schematic view of a binding relationship among an IP-CAN session, IP-CAN bearers, PCC rules, and IP flows.

Through the above process of establishing the IP-CAN session and the process of establishing the IP-CAN bearer, a binding relationship shown in FIG. 2 is formed on the PCEF/GW. FIG. 2 is a schematic view of a binding relationship among an IP-CAN session, IP-CAN bearers, PCC rules, and IP flows. As shown in FIG. 2, it is assumed that, in the establishment of the IP-CAN session, two IP-CAN bearers with different QoS requirements are established in the same IP-CAN session, so as to satisfy different QoS requirements, and each IP-CAN bearer may have a plurality of IP flows, for example, the user may download files from different servers at the same time. As shown in FIG. 2, an IP-CAN bearer 1 includes two IP flows, that is, IP flow 1 and IP flow 2, and an IP-CAN bearer 2 includes four IP flows, that is, IP flow 3 to IP flow 6.

Figure 3:
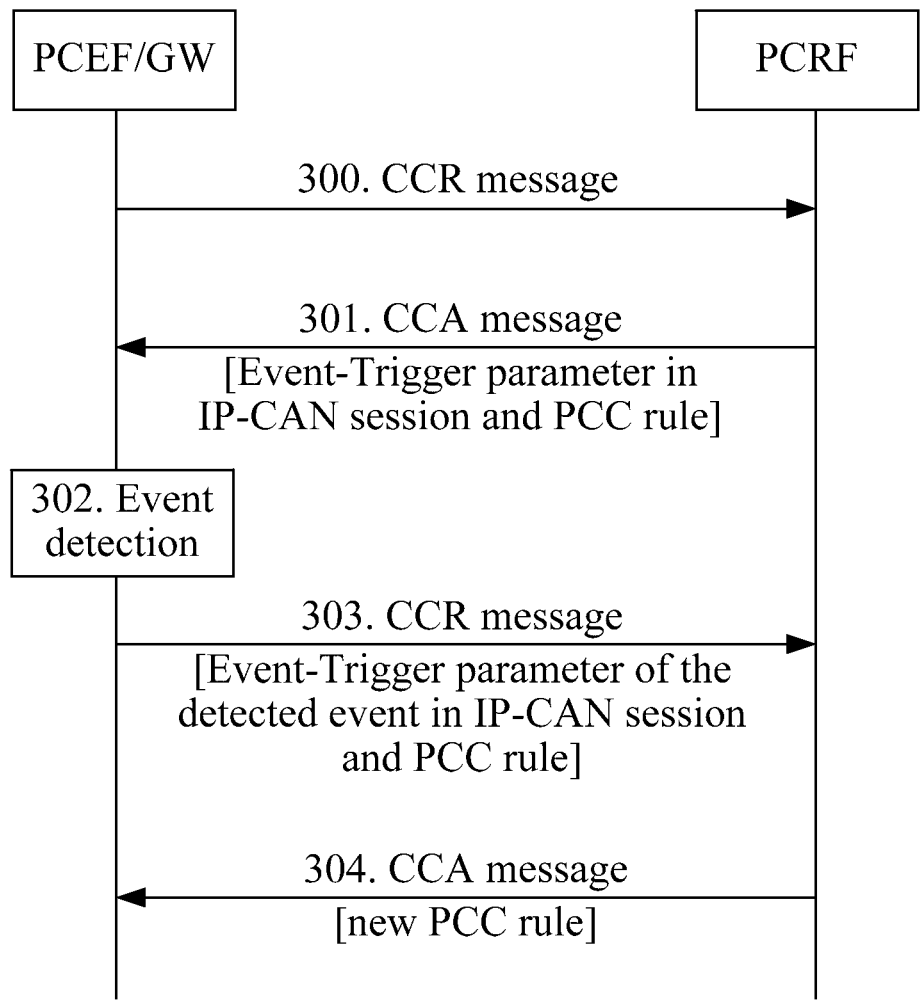
FIG. 3 is a flow chart of event detection and reporting in an application scenario according to an embodiment of the present invention.

In a PCC architecture defined in the 3GPP, the PCRF not only delivers the PCC rules to the PCEF/GW, but also requests the PCEF/GW to detect certain events, for example, disconnection or recovery of connection of an IP-CAN bearer, GW failure, etc. Upon detecting a corresponding event, the PCEF reports the event to the PCRF, and the PCRF determines a new PCC rule again according to the reported event. FIG. 3 is a flow chart of existing event detection and reporting. As shown in FIG. 3, the existing method of realizing event detection includes the following steps.

In Step 300, a PCEF/GW sends a CCR message to a PCRF to request a PCC rule.

In Step 301, the PCRF returns a CCA message to the PCEF/GW.

The CCA message carries a PCC rule, and an Event-Trigger parameter for instructing the PCEF/GW to detect a certain event. The specific message format is shown as follows (for the sake of simplicity, not all parameters are listed).

```
<CC-Answer> ::=    < Diameter Header: 272, PXY >
                   < Session-Id > (Session ID, corresponding to
one IP-CAN session)
                   { Auth-Application-Id }
                   { Origin-Host }
                   { Origin-Realm }
                   *[ Event-Trigger ] (Event to be detected)
                   *[ Charging-Rule-Install ] (PCC rule to be executed,
and an IP-CAN bearer ID is further included if the PCRF performs
bearer binding)
```

As seen from the existing CCA message format, the event detection delivered by the PCRF to the PCEF/GW is directed to the entire IP-CAN session.

The Event-Trigger parameter indicates the event to be detected, and * denotes that zero to a plurality of parameters may exist. The content of the Event-Trigger parameter includes enumerated values of various events. If a plurality of events needs to be designated at the same time, a plurality of Event-Trigger parameters is required.

The Charging-Rule-Install parameter indicates a rule to be executed, which is called a rule execution parameter for short. The parameter includes sub-parameters shown in Table 1.

TABLE 1

```
Charging-Rule-Install ::=   < AVP Header: 1001 >
            *[ Charging-Rule-Definition ]   (Definition of an
installed rule, which is called a rule definition parameter for short)
            *[ Charging-Rule-Name ] (Name of the installed rule)
            *[ Charging-Rule-Base-Name ] (Name of a group of
            installed rules)
            [ Bearer-Identifier ]    (IP-CAN bearer ID)
            *[ AVP ]        (Attribute-value pair, identifying that
the current parameter may be extended to include other parameters)
```

After dynamically generating the new PCC rule, the PCRF carries the new rule through the Charging-Rule-Definition sub-parameter. If the PCRF expects the PCEF/GW to execute a PCC rule that has been pre-defined on the GW, one or more corresponding PCC rules may be designated by using the Charging-Rule-Name or the Charging-Rule-Base-Name parameter. If the PCRF performs the IP-CAN bearer binding, the PCRF may further carry the Bearer-Identifier parameter for indicating that a corresponding PCC rule designated by the Charging-Rule-Definition, Charging-Rule-Name, or Charging-Rule-Base-Name is performed on the IP-CAN bearer.

The definition of the Charging-Rule-Definition sub-parameter is shown in Table 2.

TABLE 2

```
Charging-Rule-Definition ::= < AVP Header: 1003 >
                { Charging-Rule-Name }       (Name of an installed rule)
                [ Service-Identifier ]                   (Service ID)
                [ Rating-Group ]                      (Charging group)
                *[ Flow-Description ]             (IP quintuple definition)
                [ Flow-Status ]                        (IP flow status)
                [ Authorized-QoS ]                    (Authorized QoS)
                [ Reporting-Level ]           (Charging reporting level)
                [ Online ]             (Whether to perform online charging)
                [ Offline ]           (Whether to perform offline charging)
                [ Metering-Method ]      (Offline charging metering method)
                [ Precedence ]                       (Rule precedence)
                [ AF-Charging-Identifier ]    (Application server charging ID)
```

TABLE 2-continued

| *[ Flows ] | (IP flow ID) |
| *[ AVP ] | |

In Step 302, the PCEF/GW detects statuses of all IP-CAN bearers in the IP-CAN session according to the instruction from the PCRF.

In Step 303, upon detecting a certain event, the PCEF/GW reports the Event-Trigger parameter of the detected event in the IP-CAN session and the PCC rule corresponding to an IP-CAN bearer associated with the event to the PCRF.

Furthermore, if the PCRF performs bearer binding, the PCEF/GW further reports a corresponding IP-CAN bearer ID.

In Step 304, the PCRF modifies the PCC rule or generates a new PCC rule according to the reported Event-Trigger parameter and sends the PCC rule to the PCEF/GW via a CCA message.

In addition to the event detection in the process of requesting a PCC rule by the PCEF shown in FIG. 3, the event detection may also be realized in a process of actively delivering a PCC rule by the PCRF. At this time, the PCRF carries an Event-Trigger parameter directed to the entire IP-CAN session in a re-authorization request (RAR) message and actively delivers a PCC rule, and then the PCEF/GW performs event detection in the entire IP-CAN session. The RAR message is an existing message, which is a re-authorization request initiated in the case that the original rule needs to be modified due to the modification of user subscription data or change of service information.

The main application scenario of the embodiment of the present invention has been described above.

Figure 4:
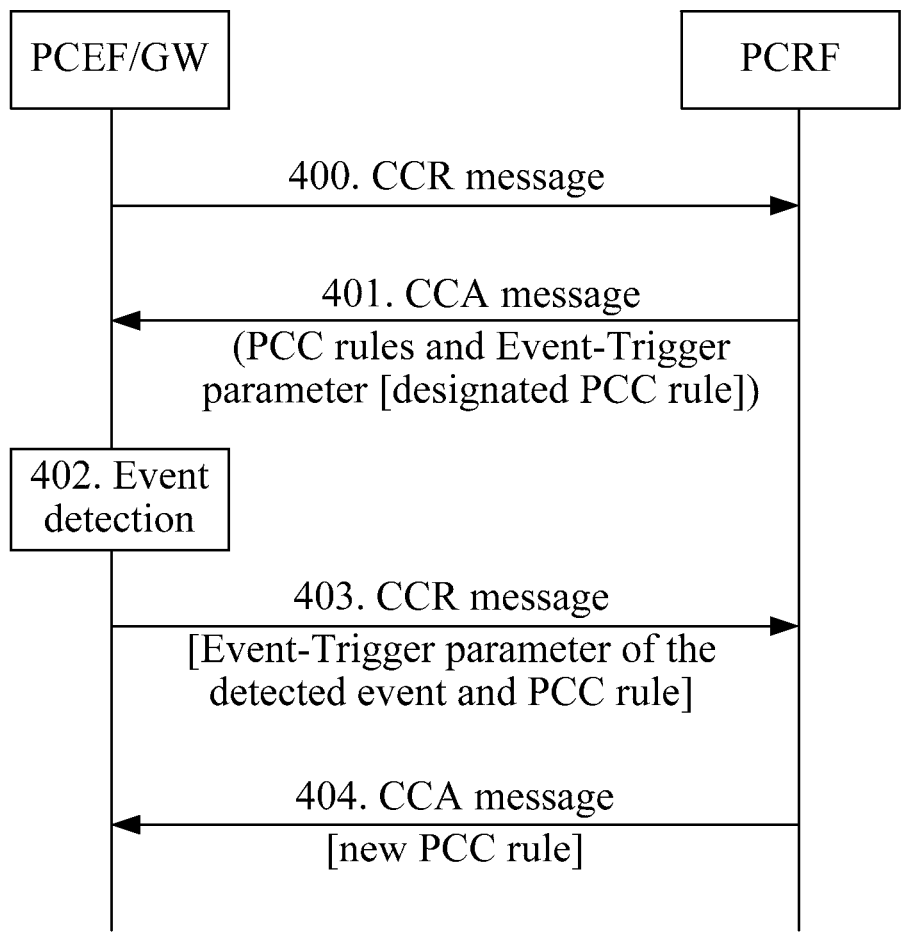
FIG. 4 is a flow chart of event detection according to a first embodiment of the present invention.

FIG. 4 is a flow chart of event detection according to a first embodiment of the present invention. As shown in FIG. 4, in this embodiment, a method of realizing event detection in the case that a PCEF/GW requests a PCC rule is provided, which includes the following steps.

In Step 400, the PCEF/GW sends a CCR message to a PCRF to request a PCC rule.

In Step 401, the PCRF returns a CCA message to the PCEF/GW.

The CCA message carries PCC rules and an Event-Trigger parameter bound to a designated PCC rule.

The PCC rules carried in the CCA message have a large range, for example, PCC rule 1, PCC rule 2, and PCC rule 3 may be carried as shown in FIG. 2, and the PCEF/GW executes the PCC rules on designated IP-CAN bearers according to the PCC rules. The designated PCC rule bound to the Event-Trigger parameter carried in the CCA message has a small range, for example, the event detection is designated only for PCC rule 1. As seen from this step, the event detection requested by the PCEF/GW is directed to the designated PCC rule.

In Step 402, the PCEF/GW detects a status of an IP-CAN bearer corresponding to the designated PCC rule according to the instruction from the PCRF.

In Step 403, upon detecting a certain event, the PCEF/GW reports the Event-Trigger parameter of the detected event and the PCC rule associated with the detected event to the PCRF through a CCR message.

In Step 404, the PCRF modifies the PCC rule or generates a new PCC rule according to the reported Event-Trigger parameter and sends the PCC rule to the PCEF/GW through a CCA message.

In this step, the CCA message may further carry a new Event-Trigger parameter that is bound to the modified PCC rule.

Figure 5:
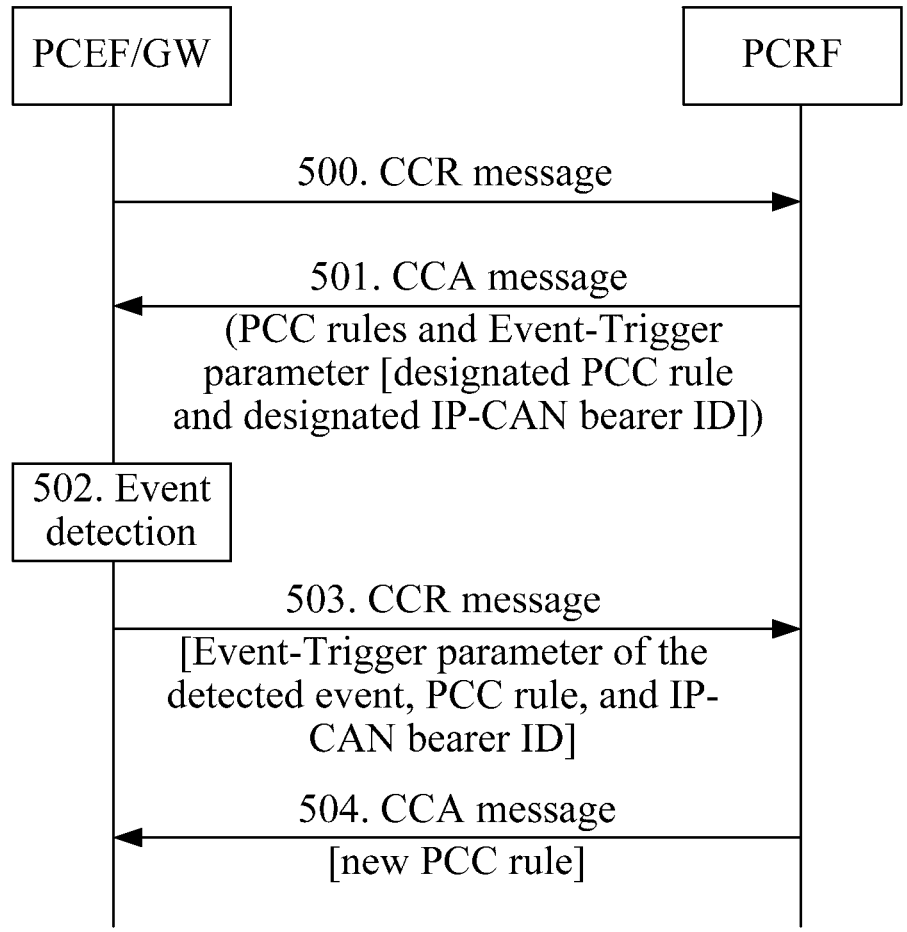
FIG. 5 is a flow chart of event detection according to a second embodiment of the present invention.

FIG. 5 is a flow chart of event detection according to a second embodiment of the present invention. As shown in FIG. 5, in this embodiment, another method of realizing event detection in the case that a PCEF/GW requests a PCC rule is provided, in which a PCRF performs binding of an IP-CAN bearer to a PCC rule. The method includes the following steps.

In Step 500, the PCEF/GW sends a CCR message to the PCRF to request a PCC rule.

In Step 501, the PCRF returns a CCA message to the PCEF/GW.

The CCA message carries PCC rules and an Event-Trigger parameter that is bound to a designated PCC rule and meanwhile bound to an IP-CAN bearer ID bound to the PCC rule.

As seen from this step, the event detection requested by the PCEF/GW is directed to the designated IP-CAN bearer.

In Step 502, the PCEF/GW detects a status of an IP-CAN bearer corresponding to the designated IP-CAN bearer ID according to the instruction from the PCRF.

In Step 503, upon detecting a certain event, the PCEF/GW reports the Event-Trigger parameter of the detected event, the PCC rule, and the IP-CAN bearer ID corresponding to the detected event to the PCRF.

In Step 504, the PCRF modifies the PCC rule or generates a new PCC rule according to the reported Event-Trigger parameter and sends the PCC rule to the PCEF/GW through a CCA message.

In this step, the CCA message may further carry a new Event-Trigger parameter that is bound to the modified IP-CAN bearer ID.

In the methods of realizing event detection in the case that the PCEF/GW requests a PCC rule shown in FIGS. 4 and 5, if the PCEF has the capability of detecting an IP flow, the PCRF may associate the requested event detection with a designated IP flow in a PCC rule, that is, carrying, in the CCA message, PCC rules and an Event-Trigger parameter that is bound to a designated PCC rule and further bound to a designated IP flow ID in the PCC rule, and then the PCEF detects a status of the designated IP flow in the designated PCC rule according to the instruction in the CCA message. Moreover, after modifying the PCC rule or generating a new PCC rule according to the reported Event-Trigger parameter, the PCRF further carries a new Event-Trigger parameter bound to a modified IP flow ID in the CCA message and sends the CCA message to the PCEF/GW.

Figure 6:
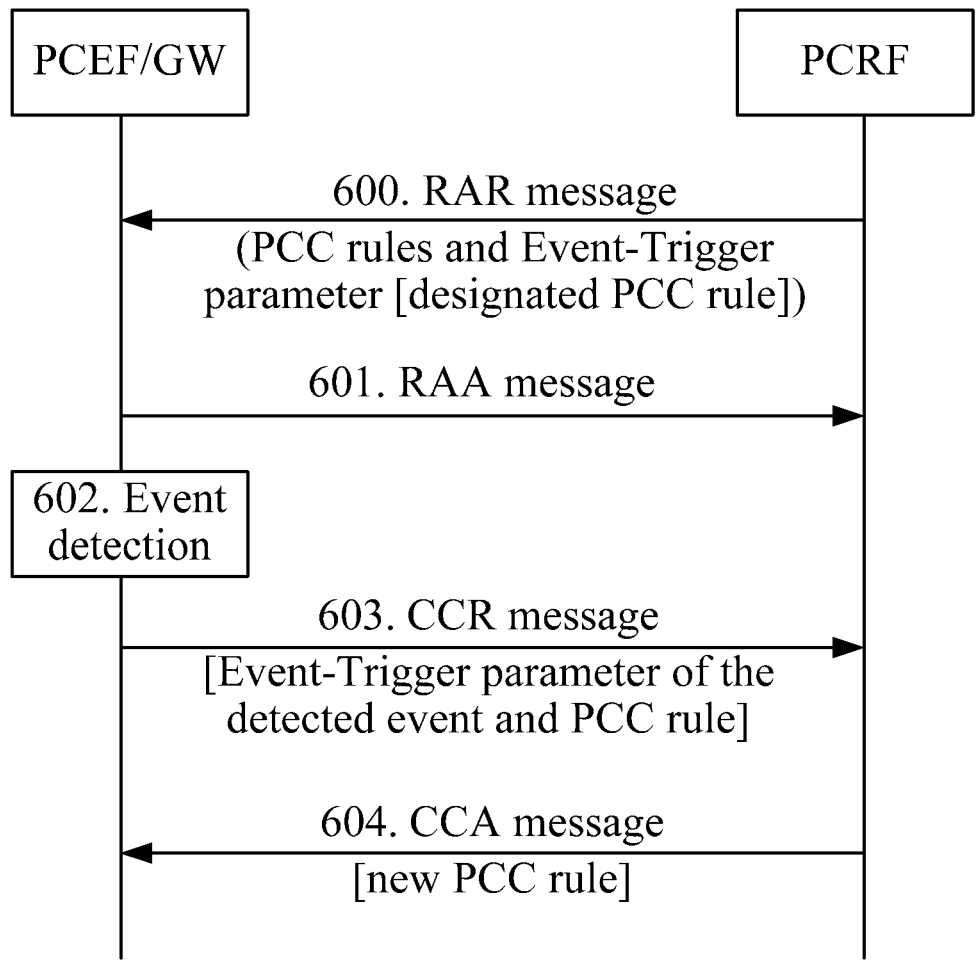
FIG. 6 is a flow chart of event detection according to a third embodiment of the present invention.

FIG. 6 is a flow chart of event detection according to a third embodiment of the present invention. As shown in FIG. 6, in this embodiment, a method of realizing event detection in the case that a PCRF actively delivers a PCC rule is provided, which includes the following steps.

In Step 600, the PCRF actively delivers PCC rules to a PCEF/GW through an RAR message and carries an Event-Trigger parameter bound to a designated PCC rule.

As seen from this step, the event detection actively delivered by the PCRF is directed to the designated PCC rule.

In Step 601, the PCEF/GW returns a re-authorization answer (RAA) message corresponding to the RAR message to the PCRF.

In Step 602, the PCEF/GW detects a status of an IP-CAN bearer corresponding to the designated PCC rule according to the instruction from the PCRF.

In Step 603, upon detecting a certain event, the PCEF/GW reports the Event-Trigger parameter of the detected event and the PCC rule associated with the detected event to the PCRF.

In Step 604, the PCRF modifies the PCC rule or generates a new PCC rule according to the reported Event-Trigger parameter and sends the PCC rule to the PCEF/GW through a CCA message.

In this step, the CCA message may further carry a new Event-Trigger parameter that is bound to the modified PCC rule.

Figure 7:
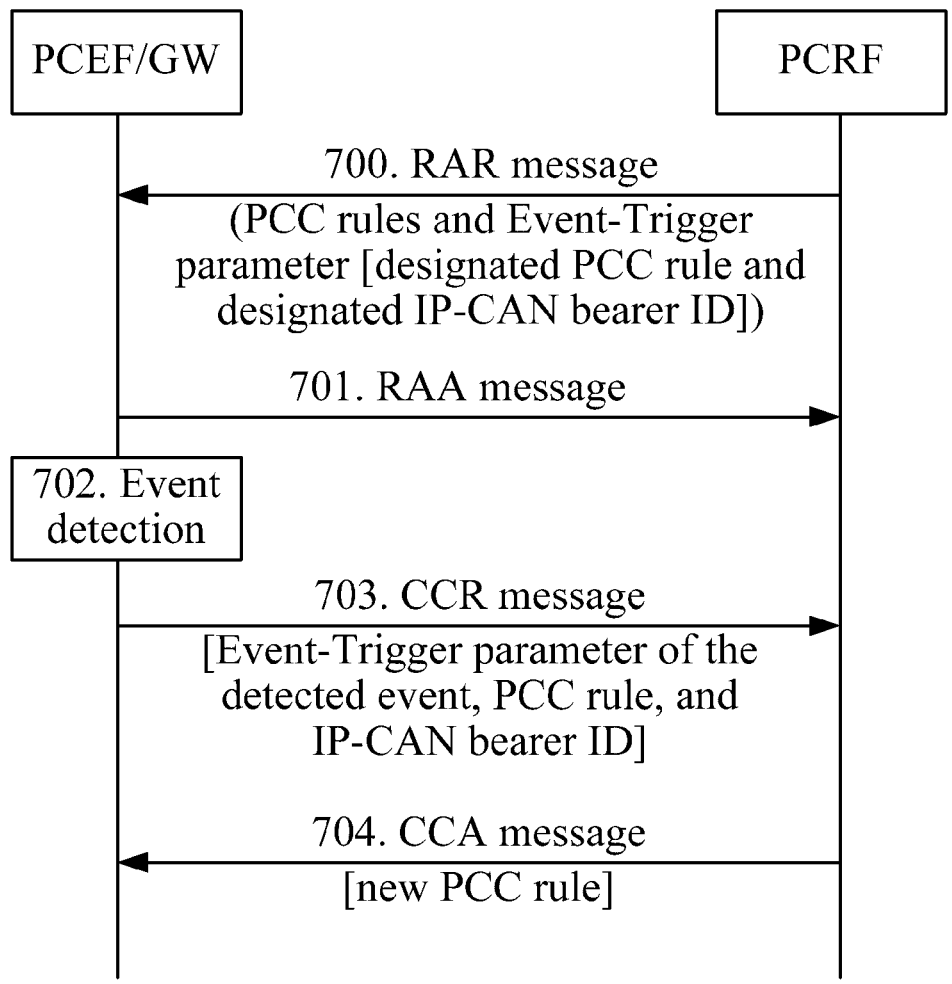
FIG. 7 is a flow chart of event detection according to a fourth embodiment of the present invention.

FIG. 7 is a flow chart of event detection according to a fourth embodiment of the present invention. As shown in FIG. 7, in this embodiment, another method of realizing event detection in the case that a PCRF actively delivers a PCC rule is provided, in which the PCRF performs binding of an IP-CAN bearer to a PCC rule. The method includes the following steps.

In Step 700, the PCRF actively delivers PCC rules to a PCEF/GW through an RAR message and carries an Event-Trigger parameter that is bound to a designated PCC rule and further bound to an IP-CAN bearer ID.

As seen from this step, the event detection actively delivered by the PCRF is directed to a designated IP-CAN bearer.

In Step 701, the PCEF/GW returns an RAA message the PCRF.

In Step 702, the PCEF/GW detects a status of an IP-CAN bearer corresponding to the designated IP-CAN bearer ID according to the instruction from the PCRF.

In Step 703, upon detecting a certain event, the PCEF/GW reports the Event-Trigger parameter of the detected event, the PCC rule associated with the detected event, and the corresponding IP-CAN bearer ID thereof to the PCRF.

In Step 704, the PCRF modifies the PCC rule or generates a new PCC rule according to the reported Event-Trigger parameter and sends the PCC rule to the PCEF/GW through a CCA message.

In this step, the CCA message may further carry a new Event-Trigger parameter that is bound to the modified IP-CAN bearer ID.

Figure 8:
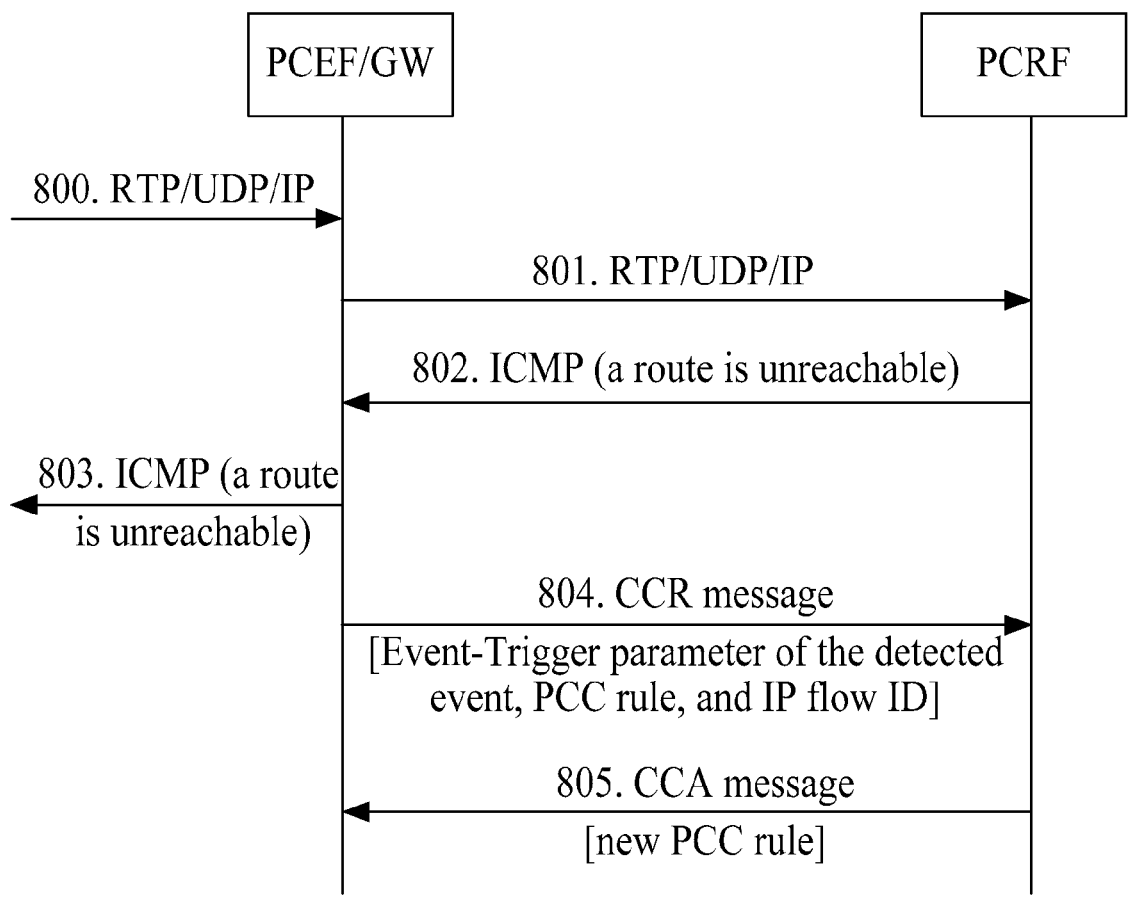
FIG. 8 is a flow chart of event detection according to a fifth embodiment of the present invention.

In the methods of realizing event detection in the case that the PCRF actively delivers a PCC rule as shown in FIGS. 6 and 7, if the PCEF has the capability of detecting an IP flow, the PCRF may further associate the requested event detection with a designated IP flow in the PCC rule, that is, carrying, in the RAR message, PCC rules and an Event-Trigger parameter that is bound to a designated PCC rule and further bound to a designated IP flow ID in the PCC rule, and then the PCEF detects a status of the designated IP flow in the designated PCC rule according to the instruction of the CCA message. Moreover, after modifying the PCC rule or generating a new PCC rule according to the reported Event-Trigger parameter, the PCRF may further carry a new Event-Trigger parameter bound to a modified IP flow ID through the CCA message and send it to the PCEF/GW FIG. 8 is a flow chart of event detection according to a fifth embodiment of the present invention. In this embodiment, a PCEF detects and reports a status of a packet flow when a PCEF/GW has the capability of detecting an IP flow, for example, detecting a corresponding Internet control message protocol (ICMP) packet. As shown in FIG. 8, the embodiment includes the following steps.

In Steps 800 to 803, after establishing an IP-CAN bearer with the PCEF/GW, a UE sends an IP flow, for example, a real-time transmission protocol (RTP) flow in this embodiment, on the IP-CAN bearer, and then the PCEF/GW forwards the IP flow to an external network. The PCEF/GW receives an ICMP packet indicating that a route is unreachable from the external network and forwards the received ICMP packet to the UE.

In Step 804, after detecting that a PCRF has delivered an event directed to the currently sent IP flow, that is, receiving a trigger event from the external network including, for example, route unreachable information in this embodiment, the PCEF/GW reports the Event-Trigger parameter to the PCRF and associates the parameter with a designated IP flow in a PCC rule.

In this step, the PCEF/GW carries the Event-Trigger parameter of the detected event, the PCC rule associated with the detected event, and the IP flow ID of the designated IP flow in a CCR message.

In Step 805, the PCRF modifies the PCC rule or generates a new PCC rule according to the reported Event-Trigger parameter and sends the PCC rule to the PCEF/GW through a CCA message.

In this step, the CCA message may further carry a new Event-Trigger parameter that is bound to a packet flow ID in the modified PCC rule.

It should be noted that, if an Event-Trigger parameter is bound to a PCC rule at the very beginning when the Event-Trigger parameter is delivered, the Event-Trigger parameter may further be bound to an IP-CAN bearer ID or IP flow when the Event-Trigger parameter is delivered again.

In the above embodiments, in order to realize the binding of an Event-Trigger parameter to a PCC rule, IP-CAN bearer ID, or IP flow ID, the present invention provides the following three realization methods.

In the first method, a new parameter, for example, a PCC-Event-Trigger parameter is defined. The PCC-Event-Trigger parameter includes an Event-Trigger parameter, a PCC rule name, or IP-CAN bearer ID, or IP flow ID. The specific format is shown as follows.

```
PCC-Event-Trigger ::= <    AVP Header: XXXX >
                      1* { Event-Trigger }
                      *[ Charging-Rule-Name ]
                      *[ Charging-Rule-Base-Name ]
                      *[ Bearer-Identifier ]
                      *[ Flow-Identifier ]
                      *[ AVP ]
```

1*{Event-Trigger} denotes that the PCC-Event-Trigger parameter must carry one or more Event-Trigger parameters.

*[Charging-Rule-Name] and *[Charging-Rule-Base-Name] denote that the PCC-Event-Trigger parameter may carry zero to a plurality of PCC rules (or rule groups), and if PCC rules (or rule groups) are carried, it indicates that the carried Event-Trigger parameters must be bound to the PCC rules (or rule groups), that is, the PCEF/GW must detect statuses of IP-CAN bearers associated with the rules.

In the case that the PCRF performs the IP-CAN bearer binding, zero to a plurality of IP-CAN bearer IDs is carried through the *[Bearer-Identifier], which indicates that the carried Event-Trigger parameters are bound to the IP-CAN bearer IDs, so that the PCEF/GW must detect statuses of the IP-CAN bearers designated by the IP-CAN bearer IDs.

The IP flow ID (*[Flow-Identifier]) parameter in the PCC-Event-Trigger parameter is a newly defined AVP. The format thereof is shown as follows.

```
*Flow-Identifier ::=    < AVP Header: XXXX >
                        [Charging-Rule-Name]
                        [Charging-Rule-Base-Name]
                        *[Flows]
                        *[Flow-Description]
```

*[Flow-Identifier] indicates one or more specific IP flows under a certain PCC rule (PCC name), which are identified by the parameters of Flows or Flow-Description. If [Flow-Identifier] is carried, it indicates that the carried Event-Trigger parameters are bound to IP flow IDs of the IP flows.

Accordingly, the CCA message or RAR message carries the following information.

```
            < Session-Id > (Session ID, corresponding to one
            IP-CAN session)
            *[ PCC-Event-Trigger ] (Event to be detected, which
may be bound to an IP-CAN session, PCC rule, IP-CAN
bearer, or IP flow)
            *[ Charging-Rule-Install ] (Rule to be executed,
and an IP-CAN bearer ID is included if the PCRF performs the IP-CAN
bearer binding)
```

If the PCC-Event-Trigger parameter does not carry Bearer-Identifier, Charging-Rule-Name, Charging-Rule-Base-Name, and Flow-Identifier, it indicates that the carried Event-Trigger parameter is directed to the entire IP-CAN session, which is the same as that in the prior art.

In the second method, the Charging-Rule-Install parameter is extended, so that the Charging-Rule-Install parameter includes an Event-Trigger sub-parameter, which indicates that event detection is performed on an installed PCC rule (or rule group). The specific format is shown as follows.

```
        Charging-Rule-Install ::=    < AVP Header: 1001 >
                        *[ Charging-Rule-Definition ] (Definition
of an installed rule)
                        *[ Charging-Rule-Name ]    (Name
                        of the installed rule)
                        *[ Charging-Rule-Base-Name ]    (Name
of a group of installed rules)
                        [ Bearer-Identifier ]    (IP-CAN
                        bearer ID)
                        *[ Event-Trigger ]    (Event to be detected)
                        *[ AVP ]
```

*[Event-Trigger] denotes that the installed rule needs to carry zero to a plurality of Event-Trigger parameters. If Charging-Rule-Install carries the Event-Trigger parameter, it indicates that the Event-Trigger parameter must be bound to the installed PCC rules (or rule groups), that is, the PCEF/GW must detect statuses of IP-CAN bearers associated with the PCC rules. Accordingly, the CCA message or RAR message carries the following information.

```
            < Session-Id > (Session ID, corresponding to one
            IP-CAN session)
            *[ Event-Trigger ] (Event to be detected, directed
            to the session)
            *[ Charging-Rule-Install ] (The parameter may carry
            an Event-Trigger
parameter to realize event detection directed to a PCC rule)
```

It should be noted that, if an Event-Trigger parameter in a session layer conflicts with the Event-Trigger parameter in Charging-Rule-Install, the Event-Trigger parameter in Charging-Rule-Install is taken as a basis for event detection.

In the third method, a sub-parameter of the Charging-Rule-Install parameter, that is, Charging-Rule-Definition parameter, is extended, so that the Charging-Rule-Definition parameter includes an Event-Trigger sub-parameter, which indicates that event detection is performed on a dynamically installed PCC rule. The specific format is shown as follows.

```
Charging-Rule-Definition ::= < AVP Header: 1003 >
        { Charging-Rule-Name }    (Name of an installed rule)
        [ Service-Identifier ]    (Service ID)
        [ Rating-Group ]          (Charging group)
        *[ Flow-Description ]    (IP quintuple definition)
        [ Flow-Status ]          (IP flow status)
        [ Authorized-QoS ]       (Authorized QoS)
        [ Reporting-Level ]      (Charging reporting level)
        [ Online ]               (Whether to perform online
charging)
        [ Offline ]              (Whether to perform offline
charging)
        [ Metering-Method ]      (Offline charging metering method)
        [ Precedence ]           (Rule precedence)
        [ AF-Charging-Identifier ] (Application server charging ID)
        *[ Flows ]               (IP flow ID)
        *[ Event-Trigger ]       (Event to be detected)
        *[ AVP ]
```

*[Event-Trigger] denotes that the dynamically installed rule needs to carry zero to a plurality of Event-Trigger parameters. If Charging-Rule-Install where the Charging-Rule-Definition parameter belongs to carries the Event-Trigger parameter, it indicates that the Event-Trigger parameter must be bound to the dynamically installed PCC rule, that is, the PCEF/GW must detect a status of an IP-CAN bearer associated with the PCC rule. Accordingly, the CCA message or RAR message carries the following information.

```
            < Session-Id > (Session ID, corresponding to one
            IP-CAN session)
            *[ Event-Trigger ] (Event to be detected, directed to
            the session)
            *[ Charging-Rule-Install ] (in the parameter, a
Charging-Rule-Definition parameter may carry an Event-Trigger
parameter to realize event detection directed to the dynamically
installed PCC rule)
```

It should be noted that, although the second method can only bind an Event-Trigger parameter to a dynamically installed PCC rule, the PCRF is not required to designate the binding of the Event-Trigger parameter to a predefined rule, that is, the PCRF is not required to deliver event detection for the PCC rule pre-configured on the PCEF, since QoS level, charging information, detected event, and other information are generally defined in the predefined PCC rule.

In addition, the Charging-Rule-Definition parameter may also be extended, so that a new Flow-Event-Trigger parameter is added to a sub-parameter thereof. The Flow-Event-Trigger parameter includes an Event-Trigger parameter and an IP flow ID. The specific format is shown as follows.

```
Flow-Event-Trigger ::= < AVP Header: XXXX >
                       1* { Event-Trigger }
                       *[ Flows ]
                       *[ AVP ]
```

1*{Event-Trigger} denotes that the Flow-Event-Trigger parameter must carry one or more Event-Trigger parameters, and *[Flows] denotes that the Flow-Event-Trigger parameter is associated with zero to a plurality of IP flows and carries a designated IP flow ID. If the *[Flows] parameter is not carried, it denotes that the Event-Trigger is associated with the entire PCC rule.

The extended Charging-Rule-Definition parameter has the following format.

```
Charging-Rule-Definition ::= < AVP Header: 1003 >
         { Charging-Rule-Name }      (Name of an installed rule)
         [ Service-Identifier ]       (Service ID)
         [ Rating-Group ] 10           (Charging group)
        *[ Flow-Description ]         (IP quintuple definition)
         [ Flow-Status ]               (IP flow status)
         [ Authorized-QoS ]            (Authorized QoS)
         [ Reporting-Level ]          (Charging reporting level)
         [ Online ]          (Whether to perform online charging)
         [ Offline ]         (Whether to perform offline charging)
         [ Metering-Method ]          (Offline charging metering method)
         [ Precedence ]                (Rule precedence)
         [ AF-Charging-Identifier ] (Application server charging ID)
        *[ Flows ]                    (IP flow ID)
        *[ Flow-Event-Trigger ]    (Event to be detected, associated with the IP flow)
        *[ AVP ]
```

Accordingly, the CCA message or RAR message carries the following information.

```
< Session-Id > (Session ID, corresponding to one IP-CAN session)
        *[ Event-Trigger ] (Event to be detected, directed to the session)
        *[ Charging-Rule-Install ] (in the parameter, a
Charging-Rule-Definition parameter may carry an Event-Trigger
parameter and a Flow-Event-Trigger parameter to realize event
detection for a designated IP flow in the Flow-Event-Trigger parameter)
```

As seen from the above methods in the present invention, the present invention binds an Event-Trigger parameter to a PCC rule and detects a status of an IP-CAN bearer corresponding to the PCC rule, so as to realize small-granularity detection for the specific PCC rule, reduce the redundant message exchange, and reduce the load of the system. Furthermore, the methods in the present invention realize small-granularity detection for a status of an IP-CAN bearer or IP flow by binding an Event-Trigger parameter to an IP-CAN ID or IP flow ID, so as to avoid the problem about too large granularity of the binding of event detection and the IP-CAN session and reduce the burden of the IP-CAN bearer detection and message exchange.

Corresponding to the methods in the present invention, a system of realizing event detection is further provided. The system at least includes a PCEF/GW and a PCRF. The PCRF is configured to carry an Event-Trigger parameter bound to a designated PCC rule when sending PCC rules to the PCEF/GW.

The PCEF/GW is configured to detect a status of an IP-CAN bearer corresponding to the PCC rule associated with an event indicated by the Event-Trigger parameter after receiving the Event-Trigger parameter.

The PCEF/GW is further configured to request a PCC rule from the PCRF. Upon detecting the occurrence of an event, the PCEF/GW further reports the Event-Trigger parameter of the detected event and the PCC rule associated with the detected event to the PCRF. The PCRF further modifies the PCC rule or generates a new PCC rule according to the reported Event-Trigger parameter and sends the PCC rule to the PCEF/GW.

The PCRF further sends a new Event-Trigger parameter bound to the modified PCC rule to the PCEF/GW.

The PCRF further performs the binding of an IP-CAN bearer to a PCC rule. In this case, the PCRF further binds the Event-Trigger parameter to an IP-CAN bearer ID of an IP-CAN bearer bound to the PCC rule, and then the PCEF/GW further detects a status of an IP-CAN bearer denoted by the designated IP-CAN bearer ID.

The PCEF/GW further requests a PCC rule from the PCRF. Upon detecting the occurrence of an event, the PCEF/GW further reports the Event-Trigger parameter of the detected event and the PCC rule and the IP-CAN bearer ID corresponding to the detected event to the PCRF. The PCRF further modifies the PCC rule or generates a new PCC rule according to the reported Event-Trigger parameter and sends the PCC rule to the PCEF/GW.

The PCRF further sends a new Event-Trigger parameter bound to the modified IP-CAN bearer ID to the PCEF/GW.

If the PCEF has the capability of detecting an IP flow, the PCRF further binds the Event-Trigger parameter to a designated IP flow ID in the PCC rule, and then the PCEF/GW further detects a status of an IP flow denoted by the designated IP flow ID in the designated PCC rule.

The PCEF/GW requests a PCC rule from the PCRF. Upon detecting the occurrence of an event, the PCEF/GW further reports the Event-Trigger parameter of the detected event, the PCC rule associated with the detected event, and the designated IP flow ID in the PCC rule to the PCRF. The PCRF further modifies the PCC rule or generates a new PCC rule according to the reported Event-Trigger parameter and sends the PCC rule to the PCEF/GW.

The PCRF further sends a new Event-Trigger parameter bound to a modified IP flow ID to the PCEF/GW.

The above descriptions are merely preferred embodiments of the present invention, but not intended to limit the protection scope of the present invention. Any modification, equivalent replacement, and improvement made without departing from the principle of the present invention shall fall within the protection scope of the present invention.

What is claimed is:

1. A method of realizing event detection, comprising:
receiving, by a network device configured as a policy and charging enforcement function (PCEF), policy and charging control (PCC) rules and an Event-Trigger parameter bound to a designated PCC rule sent by a policy control and charging rules function (PCRF) wherein the Event-Trigger parameter is further bound to identifiers (IDs) of IP flows in the designated PCC rule; wherein a manner of binding the Event-Trigger parameter to the designated PCC rule further comprises: carrying the Event-Trigger parameter and the designated PCC rule in a newly added parameter and indicating that the Event-Trigger parameter is bound to the designated PCC rule; and the Event-Trigger parameter is one or more Event-Trigger parameters, and the designated PCC rule carried in the newly added parameter is zero or more than one PCC rule; and detecting, by the PCEF network device, a status of IP flows which are denoted by respective IDs of the corresponding IP flows in the designated PCC rule.

2. The method according to claim 1, wherein after detecting an occurrence of an event, the method further comprises:

reporting, by the PCEF network device, the Event-Trigger parameter of the detected event and the PCC rule associated with the detected event to the PCRF network device; and modifying the PCC rule or generating a new PCC rule, by the PCRF network device, according to the reported Event-Trigger parameter and sending the PCC rule to the PCEF network device.

3. The method according to claim 1, wherein the detected event is a trigger event received by the PCEF network device from an external network.

4. The method according to claim 1, wherein the newly added parameter further comprises: an IP flow ID parameter for indicating one or more IP flows under a PCC rule, and the Event-Trigger parameter carried in the newly added parameter is bound to an IP flow ID indicated by the IP flow ID parameter; and the IP flow ID parameter comprises a name of a designated PCC rule and zero or more than one IP flows in the PCC rule.

5. A network device configured as a policy and charging enforcement function (PCEF), configured to receive a policy and charging control (PCC) rule bound to an Event-Trigger parameter, wherein the Event-Trigger parameter is further bound to identifiers (IDs) of IP flows in a designated PCC rule and further configured to detect a status of IP flows denoted by respective IDs of the corresponding IP flows in the designated PCC rule; wherein a manner of binding the Event-Trigger parameter to the designated PCC rule further comprises: carrying the Event-Trigger parameter and the designated PCC rule in a newly added parameter and indicating that the Event-Trigger parameter is bound to the designated PCC rule; and the Event-Trigger parameter is one or more Event-Trigger parameters, and the designated PCC rule carried in the newly added parameter is zero or more than one PCC rule and the PCEF network device configured to detect a status of IP flows denoted by respective IDs of the corresponding IP flows in the designated PCC rule.

6. A system of realizing event detection, at least comprising a network device configured as a Policy and Charging Enforcement Function (PCEF) and a network device configured as a Policy control and Charging Rules Function (PCRF) in another server in the network, wherein the PCRF network device is configured to carry an Event-Trigger parameter bound to a designated Policy and Charging Control (PCC) rule when sending PCC rules to the PCEF network device, wherein the Event-Trigger parameter is further bound to identifiers (IDs) of IP flows in the designated PCC rule; wherein a manner of binding the Event-Trigger parameter to the designated PCC rule further comprises: carrying the Event-Trigger parameter and the designated PCC rule in a newly added parameter and indicating that the Event-Trigger parameter is bound to the designated PCC rule; and the Event-Trigger parameter is one or more Event-Trigger parameters, and the designated PCC rule carried in the newly added parameter is zero or more than one PCC rule; and the PCEF network device is configured to detect a status of IP flows denoted by respective IDs of the corresponding IP flows in the designated PCC rule.

* * * * *